US009213400B2

(12) United States Patent
Wells (10) Patent No.: US 9,213,400 B2
(45) Date of Patent: Dec. 15, 2015

(54) APPARATUS AND METHOD TO PROVIDE NEAR ZERO POWER DEVSLP IN SATA DRIVES

(71) Applicant: Intel Corporation, Santa Clara, CA (US)

(72) Inventor: Steven E. Wells, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 13/804,247

(22) Filed: Mar. 14, 2013

(65) Prior Publication Data
US 2014/0281600 A1    Sep. 18, 2014

(51) Int. Cl.
*G06F 1/32*    (2006.01)
*G06F 3/06*    (2006.01)

(52) U.S. Cl.
CPC ............ *G06F 1/3268* (2013.01); *G06F 1/3206* (2013.01); *G06F 1/3275* (2013.01); *G06F 3/0625* (2013.01); *G06F 3/0634* (2013.01); *G06F 3/0688* (2013.01); *Y02B 60/1228* (2013.01); *Y02B 60/1246* (2013.01)

(58) Field of Classification Search
CPC ....... G06F 1/32; G06F 1/3275; G06F 1/3268; G06F 3/0625
USPC ............................ 713/323, 324, 320; 365/226
See application file for complete search history.

(56) References Cited

U.S. PATENT DOCUMENTS

| 8,051,314 | B2* | 11/2011 | Huffman et al. | 713/323 |
| 8,195,971 | B2* | 6/2012 | Jiang | 713/324 |
| 2012/0151121 | A1* | 6/2012 | Braga | 711/103 |
| 2012/0226927 | A1* | 9/2012 | Kagan et al. | 713/323 |

OTHER PUBLICATIONS

Intel Corporation and SanDisk Corporation, "Serial ATA Device Sleep (DevSleep) and Runtime D3 (RTD3)", White Paper, Dec. 2011.

* cited by examiner

*Primary Examiner* — Chun Cao
(74) *Attorney, Agent, or Firm* — Chapin IP Law, LLC (57) ABSTRACT

Apparatus and methods of reducing power consumption in solid-state disks (SSDs) that can reduce power levels in SSDs below levels achievable in known SSD reduced power states. The apparatus is a power management subsystem operative to detect whether an SSD subsystem has been enabled to enter a reduced power state, and to receive a control signal from a host directing the power management subsystem to place the SSD subsystem in the reduced power state. In the event the SSD subsystem is enabled to enter the reduced power state and the host asserts the control signal, the power management subsystem effectively disconnects at least a portion of the SSD subsystem from the power rail. In the event power-up clear circuitry asserts a clear signal to the power management subsystem, or the host negates the control signal, the power management subsystem reestablishes the connection between the SSD subsystem and the power rail.

20 Claims, 5 Drawing Sheets

APPARATUS AND METHOD TO PROVIDE NEAR ZERO POWER DEVSLP IN SATA DRIVES

BACKGROUND

Solid-state storage devices such as solid-state disks (SSDs) have been increasingly employed in battery based systems such as laptop and tablet computers, as well as computerized devices such as smartphones. In a typical computer system or computerized device, a host computer can access an SSD via a computer bus interface. For example, the computer bus may be a serial advanced technology attachment (SATA) bus. The term "SATA" refers to a computer bus interface for connecting host bus adapters to mass storage devices such as SSDs, hard disk drives, and optical drives. A SATA controller or host adapter in a host computer can employ an advanced host controller interface (AHCI) to control a SATA bus between the host computer and an SSD. The term "AHCI" refers to a technical standard defined by Intel Corporation, Santa Clara, Calif., United States, that specifies the operation of SATA host bus adapters in a non-implementation-specific manner. SSDs may include non-volatile semiconductor storage media such as NAND or NOR flash memory for storing digital information (e.g., data, computer-executable instructions, applications) in arrays of memory cells. Because the digital information is stored in the NAND or NOR flash memory of an SSD, it can persist in the computer system or computerized device even if power is lost to the SSD. After power is restored to the SSD, the host computer can use the SATA controller to access the digital information from the SSD.

Due in no small part to the widespread use of SSDs in laptop/tablet computers as well as smartphones, techniques for reducing power consumption in SSDs have gained increased attention in recent years. For example, a SATA controller may be used to implement a power management technique that allows an SSD to be placed in a reduced power state, such as the known "Partial" or "Slumber" reduced power state. When placed in the Partial reduced power state, the SSD enters a reduced power mode (e.g., typically 200-850 milliwatts), and the resume latency is typically 6-10 μseconds. When placed in the Slumber reduced power state, the SSD enters a further reduced power mode (e.g., typically 100-200 milliwatts), however the resume latency is increased to typically 1.5-10 milliseconds. For both the Partial and Slumber reduced power states, the SATA controller and the SSD generally employ in-band signaling to transmit/receive commands required to change the respective power states, prohibiting the physical layer (PHY) interface of the SSD (also referred to herein as the "device PHY interface") from being fully powered down.

To achieve even further reduced power consumption in SSDs, a SATA controller can be used to implement a power management technique that employs out-of-band signaling to transmit a control signal, such as the known "DEVSLP" signal, to an SSD. When the SATA controller asserts the DEVSLP signal, the SSD can enter the known "DevSleep" reduced power state. When the SATA controller negates the DEVSLP signal, the SSD can resume normal operation. Because out-of-band signaling is used to place the SSD in the DevSleep reduced power state, the device PHY interface can be fully powered down, thereby providing reduced power mode operation (e.g., typically about 5 milliwatts or less) with a resume latency of typically about 100 milliseconds or less.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION

Apparatus and methods of reducing power consumption in solid-state storage devices such as solid-state disks (SSDs) are disclosed that can reduce idle power levels in SSDs below the levels currently achievable in known SSD reduced power states. In one embodiment, the disclosed apparatus for reducing power consumption in SSDs is a power management subsystem, which is operative to detect whether an SSD subsystem has been enabled to enter a reduced power state, and to receive a control signal from a host computer directing the power management subsystem to place the SSD subsystem in the reduced power state. In the event the SSD subsystem has been enabled to enter the reduced power state and the host computer asserts the control signal, the power management subsystem effectively disconnects at least a portion of the SSD subsystem from the power rail. In the event the host computer negates the control signal or power-up clear circuitry asserts a power-up clear signal to the power management subsystem, the power management subsystem reestablishes the connection between the SSD subsystem and the power rail.

By effectively disconnecting and reestablishing the connection between at least a portion of an SSD subsystem and the power rail based at least on whether the SSD subsystem has been enabled to enter a reduced power state, as well as whether a control signal is asserted by a host computer directing that the SSD subsystem be placed in the reduced power state, power consumption in the SSD subsystem can be reduced to levels below the levels currently achievable in known SSD reduced power states, such as the known "Partial", "Slumber", and "DevSleep" reduced power states. The Partial and Slumber reduced power states are defined in *Serial Advanced Technology Attachment (SATA) International Organization: Serial ATA Revision* 3.1, Jul. 18, 2011, *Gold Revision*, or latest revision (also referred to herein as the "SATA specification"). The DevSleep reduced power state is defined in *Serial ATA Technical Proposal: SATA*31_*TPR*_*C*108, *Device Sleep, Revision* 1.0a, Oct. 24, 2011, or latest revision (also referred to herein as the "Device Sleep specification").

Figure 1:
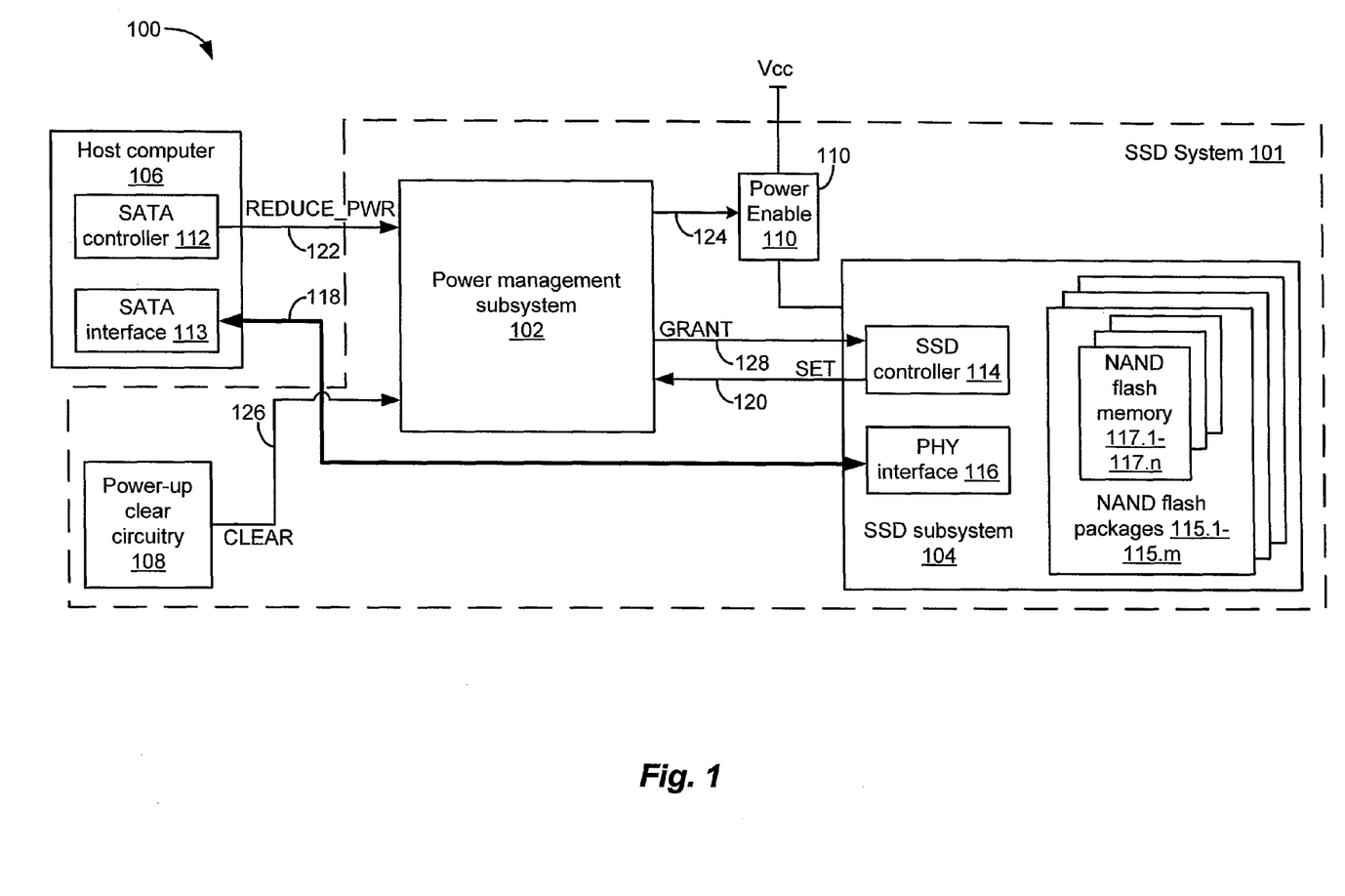
FIG. 1 is a block diagram of an exemplary computer system including an exemplary power management subsystem, in accordance with the present application.

FIG. 1 depicts an illustrative embodiment of a computer system 100 that includes an SSD system 101 and an exemplary power management subsystem 102, in accordance with the present application. As shown in FIG. 1, the computer system 100 further includes an SSD subsystem 104, a host computer 106, power-up clear circuitry 108, and a power enable component 110 operatively connected between at least a portion of the SSD subsystem 104 and the power rail (Vcc; e.g., +3.3 volts). The host computer 106 includes a storage controller, such as a SATA controller 112, and a physical layer (PHY) interface, such as a SATA interface 113, which collectively constitutes an advanced host controller interface (AHCI) controller conforming to the technical standard defined in *Serial ATA Advanced Host Controller Interface (AHCI), Revision* 1.3, Jun. 26, 2008, or latest revision. The SSD subsystem 104 includes an SSD controller 114, one or more non-volatile memory packages such as NAND flash memory packages 115.1-115.*m* (also referred to herein as the "NAND flash packages"), and a physical layer (PHY) interface 116, which are configured to support SATA enabled features. It is noted that such non-volatile memory may come in various forms, including, but not limited to, NAND flash memory, NOR flash memory, ferroelectric random access memory (FeTRAM), nanowire-based non-volatile memory, three-dimensional (3D) crosspoint memory such as phase change memory (PCM), memory that incorporates memristor technology, magnetoresistive random access memory (MRAM), and spin transfer torque (STT)-MRAM. The NAND flash packages 115.1-115.*m* can each include one or more NAND flash memory dice. For example, the NAND flash package 115.1 can include a plurality of NAND flash memory dice 117.1-117.*n*. The host computer 106 and the SSD subsystem 104 are operative to employ in-band signaling to transmit/receive predetermined control (commands) and/or data traffic over a bus 118 connected between the SATA interface 113 and the device PHY interface 116. The SATA controller 112 within the host computer 106 is operative to use out-of-band signaling to transmit one or more predetermined control signals to the power management subsystem 102 over a line 122. It is noted that any suitable embodiment of the power-up clear circuitry 108 may be employed in the computer system 100 of FIG. 1. It is further noted that the power management subsystem 102, the power-up clear circuitry 108, and/or the power enable component 110, may be implemented either internal or external to the SSD system 101.

Figure 2:
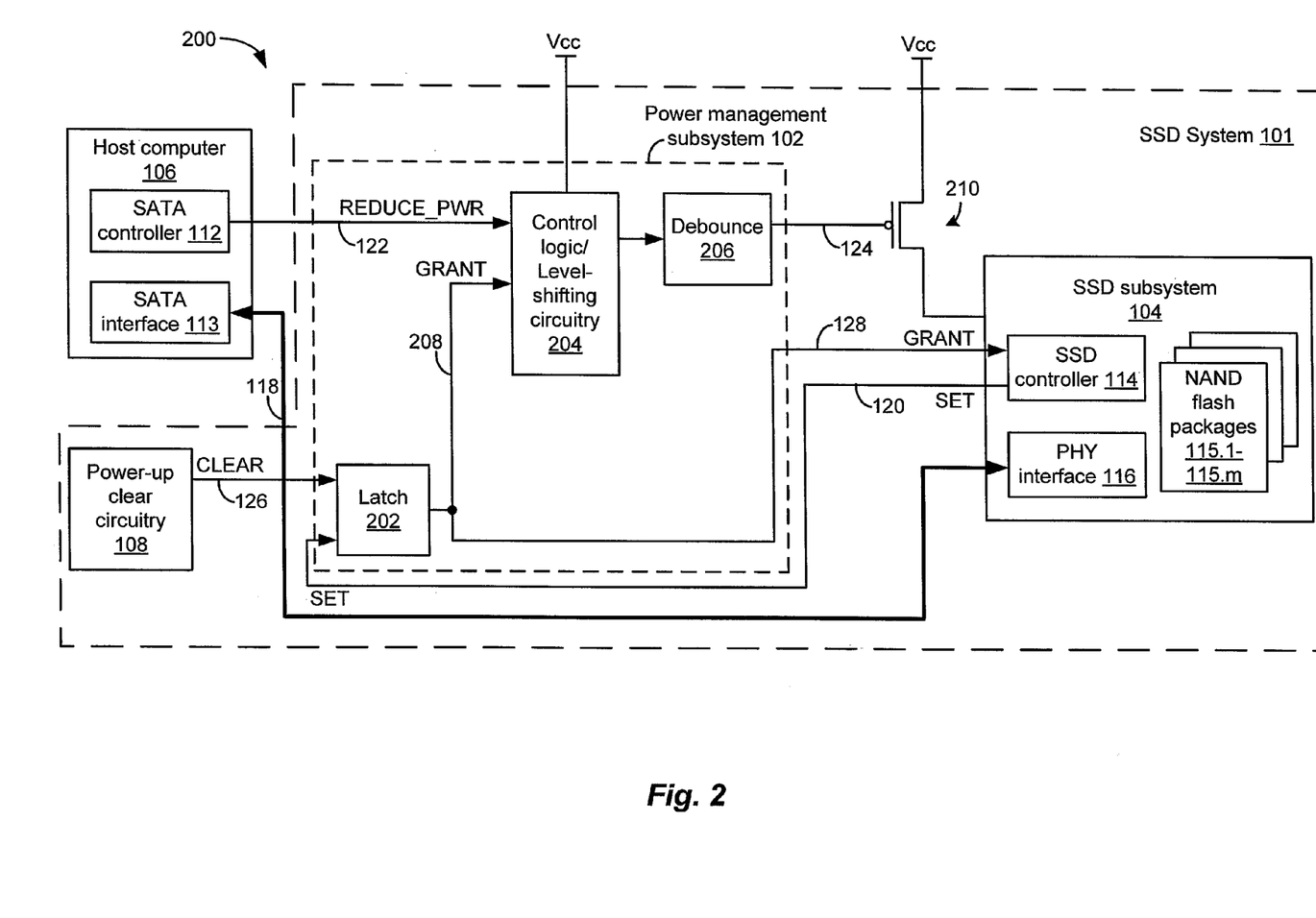
FIG. 2 is a block diagram of an exemplary detailed view of the power management subsystem of FIG. 1.

FIG. 2 depicts an exemplary computer system 200, including the SSD system 101 and an exemplary detailed view of the power management subsystem 102 of FIG. 1. As shown in FIG. 2, the power management subsystem 102 includes a latch circuit 202, control logic circuitry 204, and a debounce circuit 206. For example, the power management subsystem 102, including the latch circuit 202, the control logic circuitry 204, and the debounce circuit 206, can be implemented in physical gates/circuitry, control flow in an embedded controller, or any other suitable implementation. Further, the power enable component 110 (see FIG. 1) operatively connected between at least a portion of the SSD subsystem 104 and the power rail (Vcc) may be implemented using a PMOS field-effect transistor (PFET) 210 (see FIG. 2), or any other suitable device. Accordingly, the control logic circuitry 204 can include level-shifting circuitry powered by the power rail (Vcc) for generating control signals with voltage levels suitable for actuating the PFET 210.

The latch circuit 202 is operative to set its output to a predetermined logic state upon detection that the SSD subsystem 104 has been granted permission, by the host computer 106, to receive a predetermined control signal (also referred to herein as the "REDUCE_PWR signal"). For example, the REDUCE_PWR signal can correspond to the "DEVSLP" signal defined in the Device Sleep specification, or any other suitable control signal. In one embodiment, once the SSD subsystem 104 has been granted permission to receive the REDUCE_PWR signal, the SSD controller 114 asserts a signal (referred to herein as the "SET signal") to the latch circuit 202 on a line 120, thereby setting the output of the latch circuit 202 to the predetermined logic state. The latch circuit 202 is further operative to reset its output upon receipt of a power-up clear signal (also referred to herein as the "CLEAR signal") asserted by the power-up clear circuitry 108 on a line 126. It is noted that, upon power-up of the computer system 100, the host computer 106 has not yet granted the SSD subsystem 104 its permission to receive the REDUCE_PWR signal, and therefore the power-up clear circuitry 108 generates the CLEAR signal to assure that the output of the latch circuit 202 is reset.

As further shown in FIG. 2, the latch circuit 202 is operative to provide a logical output signal (also referred to herein as the "GRANT signal") to the control logic circuitry 204 over a line 208, as well as the SSD controller 114 within the SSD 104 subsystem over a line 128. For example, the SSD controller 114 can monitor the GRANT signal provided over the line 128 during a boot process to confirm whether the SSD subsystem 104 is in power recovery from a reduced power state (e.g., the GRANT signal is asserted) or a cold boot (e.g., the GRANT signal is de-asserted).

The control logic circuitry 204 is operative to receive the GRANT signal from the latch circuit 202 over the line 208, and the REDUCE_PWR signal from the host computer 106 over a line 122, directing the power management subsystem 102 to place the SSD subsystem 104 in the reduced power state. For example, the control logic circuitry 204 may be implemented using logical AND gate circuitry, or any other suitable circuitry.

In the event the GRANT signal from the latch circuit 202 indicates that the SSD subsystem 104 has been enabled to enter the reduced power state, and the REDUCE_PWR signal is asserted by the host computer 106 on the line 122, the control logic circuitry 204 provides a first control signal to the debounce circuit 206, which debounces the first control signal and applies it over the line 124 to the gate of the PFET 210, thereby actuating the PFET 210 to disconnect at least a portion of the SSD subsystem 104 from the power rail (Vcc). In the event the host computer 106 de-asserts the REDUCE_PWR signal to the control logic circuitry 204, the control logic circuitry 204 provides a second control signal to the debounce circuit 206, which debounces the second control signal and applies it over the line 124 to the gate of the PFET 210, causing the PFET 210 to reestablish the connection between the SSD subsystem 104 and the power rail (Vcc). By debouncing the first and second control signals provided by the control logic circuitry 204 before applying the respective control signals to the gate of the PFET 210, proper power cycling of the SSD subsystem 104 and the SSD controller 114 can be assured.

The disclosed apparatus for reducing power consumption in SSDs will be further understood with reference to the following illustrative example, and FIGS. 1 and 2. In this example, the host computer 106 enables the SSD subsystem 104 to enter a predetermined reduced power state using at least the ATA SET FEATURES command, as defined in the SATA specification. For example, the predetermined reduced power state may be the DevSleep reduced power state, or any other suitable reduced power state. At a time when there are no other commands outstanding, the host computer 106 transmits at least the ATA SET FEATURES command to the SSD subsystem 104 over the bus 118, using in-band signaling. Once the SSD subsystem 104 is enabled to enter the reduced power state, the SSD controller 114 within the SSD subsystem 104 asserts the SET signal to the latch circuit 202 on the line 120. Upon the assertion of the SET signal on the line 120, the latch circuit 202 asserts the GRANT signal to the control logic circuitry 204 on the line 208, thereby indicating to the control logic circuitry 204 that the SSD subsystem 104 has been enabled to enter the reduced power state.

After a period of device idleness, or at any other suitable time, the SATA controller 112 within the host computer 106 asserts, to the control logic circuitry 204 on the line 122, the REDUCE_PWR signal, which can correspond to the DEVSLP signal, or any other suitable control signal. Upon the assertions of the GRANT signal on the line 208 and the REDUCE_PWR (DEVSLP) signal on the line 122, the control logic circuitry 204 provides its first control signal to the debounce circuit 206. The debounce circuit 206, in turn, debounces the first control signal and applies it over the line 124 to the gate of the PFET 210, actuating the PFET 210 to disconnect at least a portion of the SSD subsystem 104 from the power rail (Vcc). For example, the PFET 210 may be actuated to disconnect one or more of the NAND flash packages 115.1-115.m, the PHY interface 116, static random access memory (SRAM) within the SSD controller 114, dynamic random access memory (DRAM) associated with the SSD subsystem 104, and/or any other suitable circuitry and/or components. Because, in this example, the power enable component 110 is implemented as any suitable semiconductor switch such as the PFET 210, the first control signal provided by the control logic circuitry 204 can be a logical HIGH signal to actuate the PFET 210 and disconnect the portion of the SSD subsystem 104 from the power rail (Vcc).

To cause the SSD subsystem 104 to resume normal operation, the host computer 106 de-asserts the REDUCE_PWR signal to the control logic circuitry 204, thereby causing the control logic circuitry 204 to provide its second control signal to the debounce circuit 206. The debounce circuit 206, in turn, debounces the second control signal and applies it over the line 124 to the gate of the PFET 210, causing the PFET 210 to reestablish the connection between the SSD subsystem 104 and the power rail (Vcc). Because, in this example, the power enable component 110 is implemented as the PFET 210, the second control signal provided by the control logic circuitry 204 can be a logical LOW signal for deactuating the PFET 210 and reestablishing the connection between the SSD subsystem 104 and the power rail (Vcc). Once the connection between the SSD subsystem 104 and the power rail (Vcc) is reestablished, the host computer 106 and the SSD subsystem 104 can use at least the COMWAKE or COMRESET/COMINIT command, as defined in the SATA specification, or any other suitable command(s), for renegotiation using in-band signaling over the bus 118.

Having described the above exemplary embodiments of the disclosed apparatus for reducing power consumption in SSDs, other alternative embodiments or variations may be made. For example, it was described herein that the control logic circuitry 204 within the power management subsystem 200 could provide the logical HIGH/LOW signals for actuating/deactuating the PFET 210 based on the state of the REDUCE_PWR signal, and the state of the GRANT signal. In an alternative embodiment, the control logic circuitry 204 can provide the logical HIGH/LOW signals for actuating/deactuating the PFET 210 based on the respective states of the REDUCE_PWR and GRANT signals, as well as the state of a third predetermined signal asserted by the SSD controller 114 upon entering a predefined low power state. In this way, the complexity of validation processes for the disclosed apparatus can be reduced.

Figure 3:
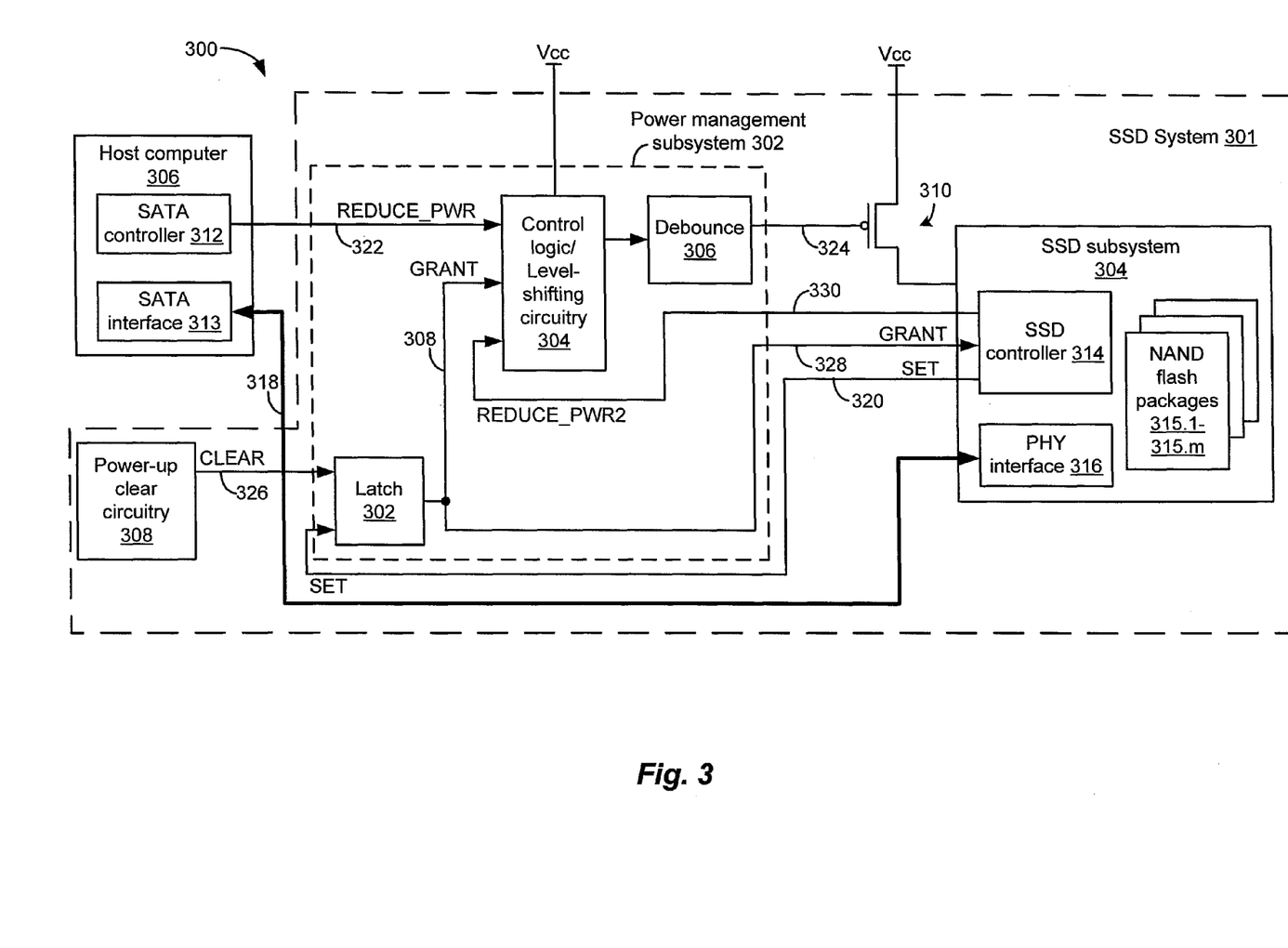
FIG. 3 is a block diagram of an exemplary computer system including an alternative embodiment of the power management subsystem of FIG. 2.

FIG. 3 depicts an exemplary computer system 300 including an SSD system 301, a power management subsystem 302, and an SSD controller 314. The computer system 300 of FIG. 3 is like the computer system 200 of FIG. 2, with the exception that the power management subsystem 302 includes control logic circuitry 304 configured to provide logical HIGH/LOW signals for actuating/deactuating a PFET 310 based on the state of the REDUCE_PWR signal, the state of the GRANT signal, and the state of the third predetermined signal (also referred to herein as the "REDUCE_PWR2 signal") asserted by the SSD controller 314 on a line 330. For example, the SSD controller 314 may be implemented using an LSI SandForce SF-1000/2000 based flash storage processor (also referred to herein as the "LSI flash storage processor"), sold by LSI Corporation, San Jose, Calif., United States, or any other suitable storage controller. Further, the REDUCE_PWR2 signal provided by the SSD controller 314 may correspond to a predetermined control signal, such as the known "PAC signal", which can be generated by the LSI flash storage processor upon entering its predefined low power state. It is noted that the computer system 300, including the power management subsystem 302 and the SSD controller 314, can provide reduced power mode operation at least as low as about 100 microwatts, with a resume latency of less than about 200 milliseconds.

It is further noted that, when the power management subsystem 202 (see FIG. 2) operates to actuate the PFET 210 to disconnect at least a portion of the SSD subsystem 104 from the power rail (Vcc), the SSD subsystem 104 may lose its context information. Further, any settings made by the host computer 106 before placing the SSD subsystem 104 into the reduced power state may have to be restored by the host computer 106 during the reapplication of power. In one embodiment, when the REDUCE_PWR2 signal (e.g., the PAC signal) is asserted by the SSD controller 314 (see FIG. 3) upon entering its predefined low power state, the SSD controller 314 has already stored the context information for the SSD subsystem 304 in memory, such as non-volatile SRAM or DRAM included in the SSD subsystem 304, or an off-chip SRAM or DRAM, thereby assuring that the context information for the SSD subsystem 304 is not lost.

It was also described herein that the power enable component 110 could be implemented using the PFET 210. In an alternative embodiment, the power enable component 110 can be implemented using a suitable regulator voltage supply operative to disable/enable power to at least a portion of the SSD subsystem 104 upon entering/recovering from a predetermined reduced power state. In a further alternative embodiment, the power enable component 110 can be implemented external to the SSD subsystem 104, or as part of the SSD subsystem 104.

It was further described herein that the disclosed power management subsystem may be employed in computer systems or computerized devices to reduce power consumption in SSDs. In alternative embodiments, apparatus and methods pertaining to the disclosed power management subsystem may be employed to reduce power consumption in hard disk drives, hybrid drives, or any other suitable drives that have SATA bus interfaces.

Figure 4:
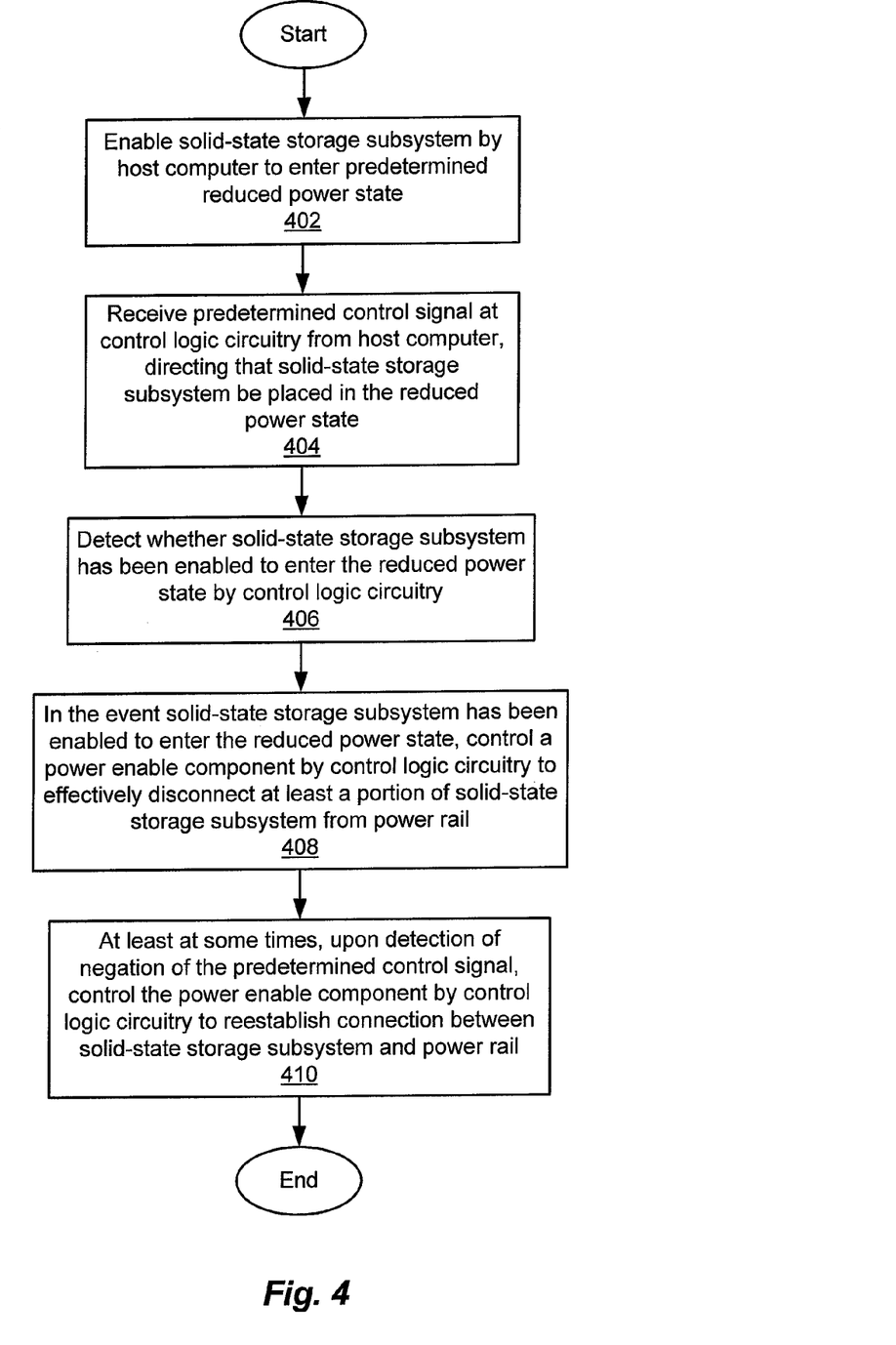
FIG. 4 is a flow diagram illustrating an exemplary method of operating the power management subsystem of FIG. 1.

An exemplary method of operating the disclosed apparatus for reducing power consumption in SSDs is described below with reference to FIG. 4. As depicted in step 402, a solid-state storage subsystem is enabled, by a host computer, to enter a predetermined reduced power state. As depicted in block 404, a predetermined control signal is received at control logic circuitry from the host computer, directing that the solid-state storage subsystem be placed in the reduced power state. As depicted in block 406, whether the solid-state storage subsystem has been enabled to enter the reduced power state is detected by the control logic circuitry. As depicted in block 408, in the event the solid-state storage subsystem has been enabled to enter the reduced power state, a power enable component is controlled by the control logic circuitry to effectively disconnect at least a portion of the solid-state storage subsystem from a power rail. As depicted in block 410, at least at some times, upon detection of negation of the predetermined control signal, the power enable component is controlled by the control logic circuitry to reestablish a connection between the solid-state storage subsystem and the power rail.

The foregoing description of exemplary embodiments is provided for purposes of illustration, and is not intended to be exhaustive or to limit the application to the precise form disclosed. Modifications and variations are possible in light of the teachings herein, or may be acquired from practice of the claimed invention. For example, while a series of operations has been described herein with reference to FIG. 4, the order of the operations may be modified in other implementations. Further, non-dependent operations may be performed in parallel.

It will be apparent that one or more embodiments described herein may be implemented in many different forms of software and/or hardware. Software code and/or specialized hardware used to implement embodiments described herein is not limiting of the claimed invention. Thus, the operation and behavior of embodiments were described herein without reference to the specific software code and/or the specialized hardware, it being understood that one of ordinary skill in the art would be able to design software and/or hardware to implement the embodiments based on the description herein.

Figure 5:
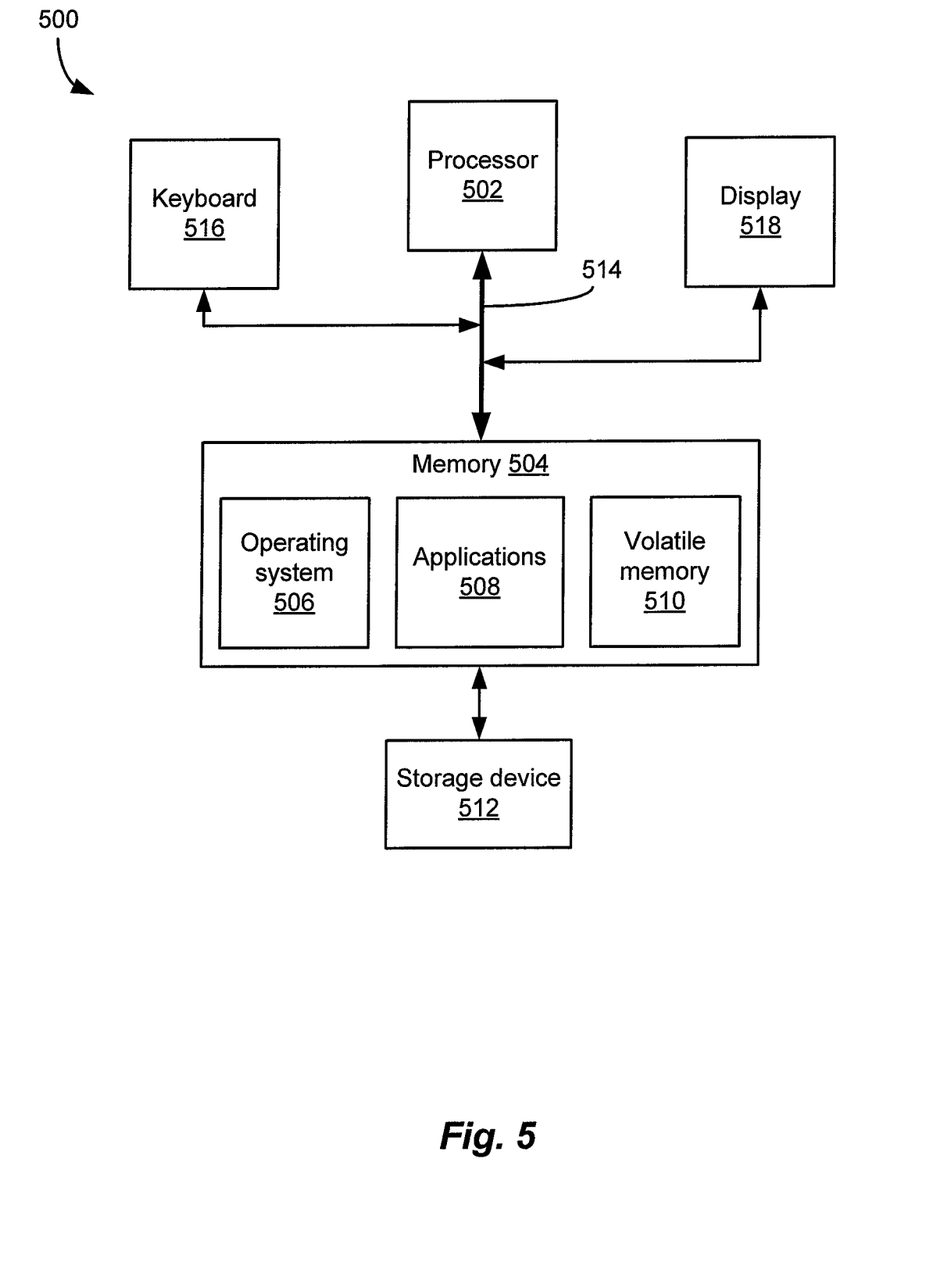
FIG. 5 is a block diagram of an exemplary computer system that can be configured to implement methods of operating the power management subsystem of FIG. 1.

Further, certain features of the claimed invention may be implemented using computer-executable instructions that may be executed by a processor or processing logic. FIG. 5 depicts an exemplary computer system 500 that can be configured to implement systems and methods of the claimed invention. As shown in FIG. 5, the computer system 500 can include at least one processor 502 communicably coupled to at least one memory 504 by a system bus 514, a keyboard 516 and a display 518 communicably coupled to the system bus 514, and at least one storage device 512 such as an SSD. The processor 502 is operative to execute instructions stored on at least one non-transitory storage medium, such as the memory 504 or any other suitable storage medium, for performing various processes within the computer system 500, including one or more processes for controlling operations of the memory 504 and/or the storage device 512. The memory 504 can include one or more memory components such as a volatile memory 510, which may be implemented as a dynamic random access memory (DRAM), or any other suitable volatile memory. The memory 504 can also be configured to store an operating system 506 executable by the processor 502, and one or more applications 508 that may be run by the operating system 506. In response to a request generated by one of the applications 508, the processor 502 can execute the operating system 506 to perform data write/read operations on the volatile memory 510 and/or the storage device 512.

It is noted that FIG. 5 illustrates an exemplary embodiment of the computer system 500, and that other embodiments of the computer system 500 may include more apparatus components, or fewer apparatus components, than the apparatus components illustrated in FIG. 5. Further, the apparatus components may be arranged differently than as illustrated in FIG. 5. For example, in some embodiments, the storage device 512 may be located at a remote site accessible to the computer system 500 via the Internet, or any other suitable network. In addition, functions performed by various apparatus components contained in other embodiments of the computer system 500 may be distributed among the respective components differently than as described herein.

No element, operation, or instruction employed herein should be construed as critical or essential to the application unless explicitly described as such. Also, as employed herein, the article "a" is intended to include one or more items. Where only one item is intended, the term "one" or similar language is employed. Further, the phrase "based on" is intended to mean "based, at least in part, on" unless explicitly stated otherwise.

It is intended that the invention not be limited to the particular embodiments disclosed herein, but that the invention will include any and all particular embodiments and equivalents falling within the scope of the following appended claims.

What is claimed is:

1. A method of reducing power consumption in solid-state storage devices, comprising:
   detecting, by control logic circuitry, whether a solid-state storage device has been enabled to enter a reduced power state, the control logic circuitry being connectable between a host computer and a solid-state storage device;
   having detected that the solid-state storage device has been enabled to enter the reduced power state:
      monitoring for receipt, at the control logic circuitry, of a predetermined control signal from the host computer directing that the solid-state storage device be placed in the reduced power state; and
      upon the receipt of the predetermined control signal from the host computer, controlling, by the control logic circuitry, a power enable component to effectively disconnect at least a portion of the solid-state storage device from a power rail, the power enable component being connectable between the solid-state storage device and the power rail; and
   upon detection of negation of the predetermined control signal, controlling, by the control logic circuitry, the power enable component to reestablish a connection between the solid-state storage device and the power rail.

2. The method of claim 1 further comprising:
   at least at some times, upon receipt of a power-up clear signal from power-up clear circuitry, controlling, by the control logic circuitry, the power enable component to reestablish the connection between the solid-state storage device and the power rail.

3. The method of claim 1 further comprising:
   once the solid-state storage device has been enabled to enter the reduced power state, receiving, at a latch circuit from a storage controller, a second control signal operative to set an output of the latch circuit to a predetermined logic state; and
   providing, by the latch circuit, a first logical output signal having the predetermined logic state to the control logic circuitry.

4. The method of claim 3 further comprising:
   receiving, at the latch circuit from power-up clear circuitry, a power-up clear signal operative to reset the predetermined logic state of the output of the latch circuit; and
   providing, by the latch circuit, a second logical output signal having the reset predetermined logic state to the control logic circuitry.

5. The method of claim 4 further comprising:
   controlling, by the control logic circuitry, the power enable component to effectively disconnect at least a portion of the solid-state storage device from the power rail, and to reestablish the connection between the solid-state storage device and the power rail, based at least on the respective states of the first and second logical output signals provided by the latch circuit.

6. The method of claim 1 further comprising:
receiving, at the control logic circuitry, a second predetermined control signal from a storage controller upon entering a predefined low power state, the predetermined control signal from the host computer and the second predetermined control signal from the storage controller each having an associated state; and
having detected the solid-state storage device having been enabled to enter the reduced power state, controlling, by the control logic circuitry, the power enable component to effectively disconnect at least a portion of the solid-state storage device from the power rail based on the state of the predetermined control signal from the host computer, and the state of the second predetermined control signal from the storage controller.

7. An apparatus for reducing power consumption in solid-state storage devices, comprising:
control logic circuitry connectable between a host computer and a solid-state storage device; and
a power enable component connectable between the solid-state storage device and a power rail, the power enable component being controllable to disconnect at least a portion of the solid-state storage device from the power rail, and to reestablish a connection between the solid-state storage device and the power rail,
wherein the control logic circuitry is operative:
to detect whether the solid-state storage device has been enabled to enter a reduced power state; and
having detected that the solid-state storage device has been enabled to enter the reduced power state:
to monitor for receipt of a predetermined control signal from the host computer directing that the solid-state storage device be placed in the reduced power state; and
upon the receipt of the predetermined control signal from the host computer, to control the power enable component to effectively disconnect at least the portion of the solid-state storage device from the power rail; and
upon detection of negation of the predetermined control signal, to control the power enable component to reestablish the connection between the solid-state storage device and the power rail.

8. The apparatus of claim 7 wherein the control circuitry is further operative to:
at least at some times, upon receipt of a power-up clear signal from power-up clear circuitry, control the power enable component to reestablish the connection between the solid-state storage device and the power rail.

9. The apparatus of claim 7 further comprising:
a latch circuit operative to:
once the solid-state storage device has been enabled to enter the reduced power state, receive, from a storage controller, a second control signal operative to set an output of the latch circuit to a predetermined logic state; and
provide a first logical output signal having the predetermined logic state to the control logic circuitry.

10. The apparatus of claim 9 wherein the latch circuit is further operative to:
receive, from power-up clear circuitry, a power-up clear signal operative to reset the predetermined logic state of the output of the latch circuit; and provide a second logical output signal having the reset predetermined logic state to the control logic circuitry.

11. The apparatus of claim 10 wherein the control logic circuitry is further operative to:
control the power enable component to effectively disconnect at least a portion of the solid-state storage device from the power rail, or to reestablish the connection between the solid-state storage device and the power rail, based at least on the respective states of the first and second logical output signals provided by the latch circuit.

12. The apparatus of claim 7 wherein the control logic circuitry is further operative to:
receive a second predetermined control signal from a storage controller upon entering a predefined low power state, the predetermined control signal from the host computer and the second predetermined control signal from the storage controller each having an associated state; and
having detected the solid-state storage device having been enabled to enter the reduced power state, control the power enable component to effectively disconnect at least a portion of the solid-state storage device from the power rail based on the state of the predetermined control signal from the host computer, and the state of the second predetermined control signal from the storage controller.

13. The apparatus of claim 7 further comprising:
a debounce circuit operative to:
receive a second control signal from the control logic circuitry;
debounce the second control signal; and
apply the second control signal to the power enable component to effectively disconnect at least a portion of the solid-state storage device from the power rail.

14. The apparatus of claim 13 wherein the debounce circuit is further operative to:
receive a third control signal from the control logic circuitry;
debounce the third control signal; and
apply the third control signal to the power enable component to reestablish the connection between the solid-state storage device and the power rail.

15. The apparatus of claim 7 wherein the power enable component is one of a PMOS field-effect transistor and a regulator voltage supply.

16. The apparatus of claim 7 wherein the solid-state storage device is a solid-state disk.

17. The apparatus of claim 7 wherein the host computer includes a SATA controller, and wherein the control logic circuitry is operative to receive the predetermined control signal from the SATA controller.

18. The apparatus of claim 17 wherein the predetermined control signal received at the control logic circuitry from the SATA controller is the DEVSLP signal.

19. The apparatus of claim 18 wherein the reduced power state entered into by the solid-state storage device is the DevSleep reduced power state.

20. A computer system, comprising:
a system bus;
a display communicably coupled to the system bus;
the apparatus of claim 7 communicably coupled to the system bus; and
at least one memory coupled to the system bus.

* * * * *